United States Patent
Shawcroft

[11] 3,715,045
[45] Feb. 6, 1973

[54] APPARATUS FOR HANDLING BALED HAY

[76] Inventor: John B. Shawcroft, Route 2, P.O. Box 290, Alamosa, Colo. 81101

[22] Filed: Dec. 20, 1971

[21] Appl. No.: 209,936

Related U.S. Application Data

[63] Continuation of Ser. No. 10,573, Feb. 11, 1970, abandoned.

[52] U.S. Cl............................................214/655
[51] Int. Cl................................................B66f 9/18
[58] Field of Search ........214/6 B, 82, 655; 294/63 R

[56] References Cited

UNITED STATES PATENTS

2,530,375  11/1950  Cartwright ..........................214/655
2,735,564  2/1956  Bickerstaff..........................214/655

Primary Examiner—Drayton E. Hoffman
Assistant Examiner—George F. Abraham
Attorney—Edwin M. Thomas

[57] ABSTRACT

A bale handling machine for gathering baled hay or straw from a field, has spaced bars or tines mounted in a lifting frame and adapted to gather bales between them. The tines have projectable bale holders to grip and support a bottom layer of bales in spaced rows. The bottom bale layer serves as a floor or pallet for upper layers of bales. The tines can be projected between spaced rows of bales in the bottom of a stack to lift and remove a whole section from a stack. The machine can be pushed or pulled by a tractor and can be combined with a baler.

10 Claims, 11 Drawing Figures

PATENTED FEB 6 1973

INVENTOR

JOHN B. SHAWCROFT

BY *Edwin M. Thomas*

ATTORNEY

APPARATUS FOR HANDLING BALED HAY

This application is a continuation of application Ser. No. 10,573, filed Feb. 11, 1970, and now abandoned.

BACKGROUND AND PRIOR ART

The handling of hay, straw, fodder and other bulky agricultural products has always involved a great deal of manual labor. Many machines and systems for handling such materials have been devised with a view to reducing such labor. In recent years machines have been introduced, for example, to bale hay, straw and the like in the field, direct from a windrow, and/or to load the bales onto vehicles or into stacks. The baling machines usually drop the bales where they are tied, to be gathered up later. The bales commonly are picked up manually and loaded onto wagons or trucks. They are handled manually at the stacks, as a rule. In some cases they are lifted into stacks by elevators or fork-lift trucks. In nearly all cases they must be realigned or adjusted manually in the stack and they are nearly always removed from the stack by hand labor. The necessity of interlocking the bales in the stack, to stabilize the stack requires manual positioning. When the bales are to be fed to cattle, or used otherwise, they are taken out of the stack bale by bale manually. Thence, they can be carried by hand or loaded manually into a truck or other vehicle, for transporting to a feed yard or other place of consumption or use. There, they usually will be unloaded by hand.

In some instances, fork lift trucks have been proposed for handling bales of hay, singly or in groups. Small fork lifts, which can handle only two or three bales usually are too expensive and inefficient for the purpose. These materials are bulky but not dense and the machine often weighs several times more than any load it can handle. Larger lift trucks can be and have been used, but they are costly machines. Such usually are not efficient for handling hay, straw or fodder. They usually require, also, that the bales either be prearranged or stacked on wooden pallets. This again entails hard and inefficient manual labor. A machine or system of reasonable size, complexity, and cost which can handle bales in relatively large groups, for stacking and unstacking without pallets and with minimum manual lifting is needed. This applies particularly to the stacking and unstacking of baled hay and the like as practiced on large farms and large feeding operations.

A substantial part of the cost of hay, for example, is spent in harvesting, baling and gathering and stacking or storing the bales. Additional manual labor is involved in taking bales out of the stack and delivering them to a point of use, e.g. to a feed lot or yard for cattle, horses, sheep, etc. Many well-balanced feeding operations require also the use of a mixture of feeds, e.g. hays of different kinds, taken from two or more separate stacks. For example, animals may thrive best on a mixture of alfalfa hay and a grass hay, or on unthreshed grain, or other types of bulky, baled food. It is obviously desirable to have available a machine that can lift a few bales and pull them right out of a stack as needed, repeating the operation at each of several stacks, then deliver the selected mixture of feeds at a single load, all with essentially no manual labor.

The apparatus of the present invention accomplishes the desired results named above. It can handle and place bales directly in the stack or in a storage barn, as they are gathered from the field, without benefit of pallets or other pre-stacking devices. Later, it can move up to any such stack, pick up one or two, or a few, or a good number of bales therefrom, move to another stack and pick up some more, all without pallets and usually without manual handling of a single bale. At the same time, the device of this invention is relatively simple in construction, positive in operation, relatively light in weight, and correspondingly inexpensive. The apparatus of the present invention also can be pushed ahead of or behind a tractor, or truck, or can be mounted in part or fully on such a vehicle. It can also be combined with or carried along with a baler.

The prior art shows a variety of bale handling devices that are broadly relevant, having such features as (1) a tractor-operated bale gripping and lifting device (U.S. Pat. to Sharp, No. 2,995,918 for multiple bales and Ealet, U.S. Pat. No. 3,006,489 for single bales). Devices are known having movable jaws for gripping bales in groups, e.g. by transverse pressure (Edwards, U.S. Pat. No. 2,979,216) as well as by hinged and pronged arms; see also Ealet above. Hydraulic power-operated tongs for bale lifting also are known, as in Rigsby, U.S. Pat. No. 3,325,029. Tractor mounted lazy tongs with movable side grippers for holding and lifting groups of bales are shown in Bishop, U.S. Pat. No. 3,241,695. All of these devices may be used or adapted for lifting bales into a stack. Probably none of them could be used, with any efficiency, for taking bales out of the stack. They are not adaptable to get hold of individual or groups of bales when the bales are associated in stacks. Bale loading attachments are known also for mounting on trucks and the like, e.g. for picking up one or two bales at a time, as in Jewell, U.S. Pat. No. 2,206,570. See also Grange, U.S. Pat. No. 3,000,522, which is arranged to lift several bales arranged in a single tier.

None of these prior art devices appears to be capable of (1) holding and setting into a stack a large group of bales in such a way that the same whole group, or a selected smaller part of it, can be lifted out of the stack later, by the handling machine and substantially without manual effort. Certain machines are known for gripping stacks of denser materials in spaced groups, as in Vogel, U.S. Pat. No. 2,509,023 or Hansen, U.S. Pat. No. 2,636,768. These are not designed or suitable, however, for handling large bulky masses made up of soft, compressible or penetrable materials like baled hay.

The present invention has several improved features which make it possible to handle baled hay, straw and the like in large volume, with minimum manual labor, both for bringing the baled material from the field to the stack and later taking it from the stack for feeding or other disposition. It is arranged to grip single bales individually, to hold them in rows and thus afford a foundation or pallet for superimposed layers of added bales. If desired, the bale handler can be combined or integrated with a baler, or attached in tandem behind a baler, to take the bales as they are produced. It is adapted, also, to be mounted and pushed in front of a truck or tractor, but it may also be pushed or towed behind. It can pick up a first layer of bales off the ground. It can be loaded mechanically or manually. Hydraulic cylinder and piston units, operated by a central power or hydraulic fluid pump source, such as a power take-off from a tractor or truck, are the means preferred to raise and lower the large tine assembly as a body but other mechanical drives can be used. Means are included also to project and withdraw from individual tines bale gripping means mounted on or within such tines. As a further feature, mechanical means, powered preferably from the tractor or other prime mover, are included to help move the loader into or out of a heavy stack of bales.

SUMMARY

In a main frame, preferably mounted on its own wheels or carried by a prime mover vehicle is mounted a suspended sub-frame. The sub-frame also has means by which it and its load can be raised or lowered with respect to the main frame. The sub-frame comprises a rigid transverse header from which several large parallel spaced tines project. The space between each pair of adjacent tines is arranged to fit approximately the thickness of a standard bale. Individual tines include normally concealed bale gripper elements which can be projected towards an adjacent tine to press into and firmly grip a bale. They may include also conveyor chains to give traction to the load. The tines are long enough that plural bales may be gripped and held simultaneously. Bales so gripped, together with the tines which hold them, thus constitute a working floor or base which, in effect, makes a "pallet" of this bottom layer of bales. Other layers of bales are loaded on top of this "pallet" and thus can be stacked to any reasonable height desired. The whole load is lifted high enough to clear the ground, by raising the sub-frame and its tines with respect to the main frame. The load thus can then be transported to the stack or storage place. There the load is set in place by lowering sub-frame and tines to or substantially to the ground. The tines then can be withdrawn by backing the loader away from the stack. By reverse procedure when bales are to be taken out of the stack, the spaced bottom tiers of bales are gripped by tines inserted between them and thus again serve as a "pallet." The bottom bales in the stack are then gripped and lifted, with the bales superimposed on them being raised together with them. The device thus can be used to take the bales out of the stack in units or in blocks of bales, as desired.

The whole unit may be supported on a truck or tractor or mounted on a pair of wheels with a forwardly extending platform (to truck or tractor) which can carry additional load to better balance the fork.

BRIEF DESCRIPTION OF DRAWINGS

FIG. 8 is a view showing a modified bale handling mechanism of this invention associated with a conventional baling machine.

DESCRIPTION OF PREFERRED EMBODIMENT

The bale handling apparatus of the present invention is designed to be pulled or pushed through a field for collecting or gathering up bales of hay, straw, and the like. The device may be arranged to be supported on its own wheels in front of a tractor or truck, preferably in laterally offset position so that it can be pushed ahead of the vehicle without blocking the driver's view, or it can be pulled behind the prime mover. Other modifications permit combining with a baler or mounting entirely on a truck or tractor. As shown in the drawings, for each embodiment the main transverse frame member is attachable to and generally supported by a prime mover, such as a tractor, truck or baling machine.

The fork unit proper is designed primarily to grip a bottom layer of bales taken from a baler or from rows of bales deposited in the field. Additional bales are loaded later on the platform of lower bales and manually placed, for proper stability, by interlocking them on this bottom layer. The apparatus includes in one form means for pushing a group of tines along the ground to straddle bales which are lying on edge on the ground as they have been dropped from a conventional baling machine. The bales are commonly dropped in rows by a baling machine, which picks up the hay while following along raked or otherwise gathered windrows. With minor modifications the present invention is also adapted to be attached to or pulled along with a baler so as to take the bales as fast as they are tied and put them in an arranged pile for delivery direct to the stack.

The essential apparatus of this invention comprises a subframe which includes or carries a group of several large tines spaced apart far enough to hold bales between them and adapted to be pushed or pulled along the ground or just above ground level. As shown here in FIGS. 1, 3, 5, and 8, there are five such tines 11A, 11B, 11C, 11D, and 11E, each having a wedge-shaped front (or rear) end 12. These tines preferably are mounted in and rigidly secured to a sub-frame 13. The frame and tines are adapted to be raised or lowered as a unit to various heights in a main frame 19. The tines may be guided along on or just above the ground so that bales lying on the ground are pushed in between them. They can be gripped between the tines which are provided with means for this purpose.

Figures 1, 2:
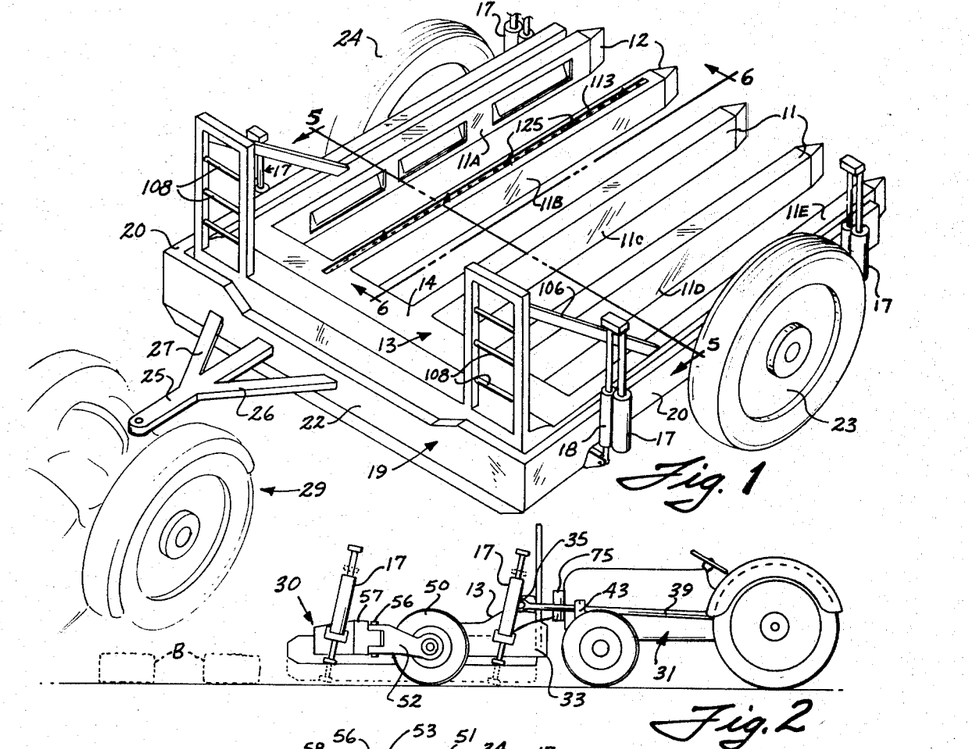
FIG. 1 is a perspective view, with some parts omitted for simplicity, of a preferred form of bale handling apparatus.
FIG. 2 is a side view and FIG. 3 a plan view on a small scale of a modified apparatus, shown as attached to and operated from a conventional farm tractor.
Figure 3:
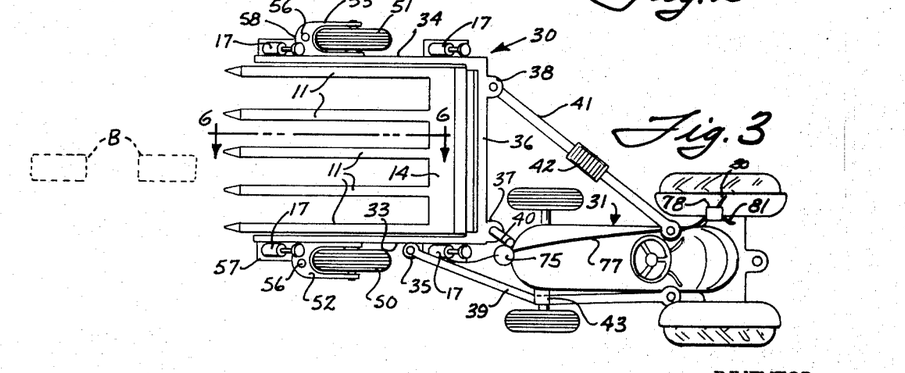

As shown in FIGS. 2 and 3, bales B, which normally are dropped on edge from the baler, may be gathered on the ground and guided up into the space between two adjacent tines. For convenience these tines are referred to generally by reference character 11. The space between any two adjacent tines 11 is designed just wide enough to accommodate the thickness of a standard bale without tightness. The tines 11A, etc., five in number as shown herein, although this number may be greater or less, project rearwardly in FIG. 1 or forwardly as seen in FIGS. 2 and 3. They are secured to the movable sub-frame 13. They can be made as separate parts or formed as an integral part of the sub-frame.

Figure 5:
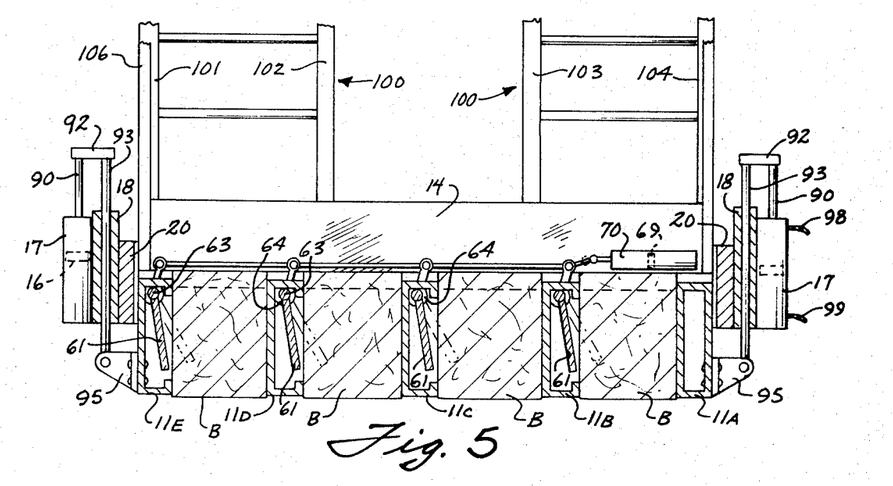
FIG. 5 is a transverse section on a larger scale taken substantially along the line 5—5 of FIG. 1.

The sub-frame comprises a broad cross-member 14 which holds the tines in rigid spaced and parallel relation with respect to each other. The sub-frame 13, together with the tines, can be lifted or lowered as a unit by hydraulic lifting mechanism supported either on the main frame or on a truck or tractor. See FIGS. 10 and 11 for the latter. This lifting mechanism, as shown in FIGS. 1, 2, and 3, comprises a slidable piston 16 in each of four hydraulic cylinders 17 and related operating equipment for moving the pistons synchronously. In other modifications, a lesser number can be used. The cylinders 17, FIGS. 1, 2, 3, and 5, are fixed to or may be integral with guide tubes 18 secured to rugged main frame side members 20 of the rigid main frame 19. These parts are best shown in FIGS. 1 and 5.

The main frame 19, FIGS. 1 to 5, comprises the side members 20. The latter are secured to a broad and rigid transverse rear member 22, and such additional bracings are provided at or near the member 22 as may be needed. Both the main frame 19 and the movable sub-frame 13 with its tines are rigid and strong enough to carry a heavy load without twisting or bending. The machine shown in FIG. 1 is mounted on two wheels 23, 24 having rigid axles attached to the main frame side members 20. A tongue 25, braced laterally by members 26, 27, is attached to main cross member 22 of the frame 19. This tongue is offset from the center of the machine so as to afford visibility to a tractor operator, when the loader is pushed as by a tractor shown in outline at 29. The tractor is shown as in a backing position, but the loader may be operated from the front of the tractor. A truck or other equivalent driving vehicle may be used instead of the tractor.

In FIGS. 2 and 3 the modified loader 30 is shown as being mounted in front of a tractor 31. In this embodiment, a main side frame 33 bears a bracket 35 and the rear cross member 36, which corresponds to member 22 of FIG. 1, bears brackets 37 and 38. To these brackets 35, 37 and 38 are attached bars 39, 40 and 41, respectively. These connect the loader to tractor 31. The bar 39 passes through a keeper 43 attached to the side of the power vehicle 31 to prevent relative transverse movement between bar 39 and the vehicle. This keeps the bale handling apparatus or stacker, as it may be called, in proper alignment with respect to the tractor 31.

In order to provide for flexibility of operation, and to allow for moving the loader over uneven ground, thus permitting limited yielding on striking obstacles, ditches, etc., one of the long bars 39 or 41 is made of a telescoping joint construction with a strong compression spring in the joint to take up slack. This is shown at 42 on bar 41, but can be applied to member 39 also or in lieu of the construction shown.

With the arrangement just described, the tractor is arranged to push the loader ahead of it in FIGS. 2 and 3. FIG. 3 shows how the tractor is off-set laterally with respect to the bale handling apparatus, or stacker, so that the driver can see ahead at all times and can guide the bale handling mechanism along a row of bales B, lying on the ground as dropped by the baler. The machine is guided so that it will pick up bales between tines until all the spaces between tines are filled up. Then gripping devices, to be described below, are operated to grip all the bales, the height of the tines being adjusted first so that the upper surfaces of all the bales are approximately even with the top surfaces of tines 11, etc. The tines and bales then form a floor or loading platform for additional bales. Ordinarily, at least one man will ride on the loader, standing on the tines 11 or on a side platform, not shown, and will direct or arrange the bales, lifting them onto upper levels as needed, while they are gathered normally by pushing the tines astride them. The device is driven through a field along a row of bales so that the bales B, normally on edge, enter neatly into the space between a pair of tines. The space between any two adjacent tines is long enough, for example, to hold three bales, or four, or more if desired. At any time desired, the tines, with or without bales between them, may be lifted above the ground. As soon as the spaces are filled with bales, the bales are gripped and the unit lifted by elevating means described further below, far enough to prevent dragging the bales further along the ground surface.

Obviously, the bales can be loaded between tines manually, if desired. This may be necessary when bales are scattered around or turned, or lying flat, or otherwise arranged in such a way that the machine cannot maneuver in front of them conveniently.

After the spaces between bales have been filled, to make a loading platform, as already described, additional bales are loaded on and are positioned manually. Loading can be manual, or by a conventional bale elevator moving alongside the stacker. Alternatively, as pointed out below, the stacker may be carried by or follow immediately behind a baling machine.

Returning to the embodiment of FIG. 1, the main frame 19 is shown to be mounted on large wheels 23, 24. This device, of course, must be steered by the tongue 25 which is connected to either the front or the rear of a tractor 30.

On the other hand, the loader shown in FIGS. 2 and 3, which is substantially identical with that of FIG. 1 except for its mounting and steering arrangement, is mounted on a pair of wheels 50, 51. These wheels preferably are of the swivel or caster mounted type. Each wheel 50, or 51, is mounted in the fork 52 or 53 of a swinging swivel mount, pivoted on a vertical kingpin 56 to a heavy bracket 57 or 58 secured to a main frame side member 20. The free steering pivotal caster-like action of this mount allows the wheels to follow as the main frame 19 is moved by the tractor in any direction, i.e. in a direction having a component which is transverse to the way the tines are pointing.

The swivel arrangement shown in FIGS. 2 and 3 is convenient when the vehicle preferably is to be pushed ahead of the tractor, which is often desirable.

The Loader also may be reversed and pulled behind a truck or tractor with its tines pointed backwards, for loading in the field. Alternatively, the device can be backed up to straddle bales until a first layer of bales is filled in between the tines. Then, these bales are gripped by means described below and lifted off the ground. The rest of the load may be picked up with the tractor going forwards. For backing the castering forks 52, 53, of FIGS. 2 and 3 can be locked against pivoting by means not shown but of obvious types. This will keep the wheels parallel at all times with the sides 20 of the frame.

An important function of this invention is to gather and hold firmly in place a first or bottom layer of bales to serve as a sort of pallet for piling on additional layers. When clamped between the tines 11, the bales and the tines form a continuous platform surface. When the loader is set into the stack, the bottom bales are arranged in spaced rows to receive the tines for a future feeding or other unstacking operation. The load may be set down on the ground or other support as a stack per se, or it may be pushed against an existing stack.

Figure 6:
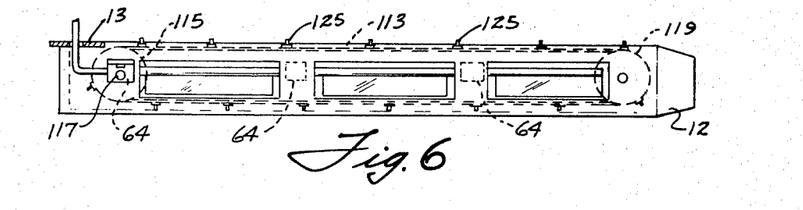
FIG. 6 is a view, partly in section, taken along line 6—6 of FIGS. 1 and 3.

To facilitate moving of the load off the loader, and also to help draw the loader into the stack for future unstacking operations, spiked conveyor chains can be mounted in some or all of the tines. One such conveyor is shown in tine 11B of FIG. 1. See also FIG. 6. Such an arrangement is shown in greater detail in FIG. 4. Tines 111, which are generally similar to the tines 11A, 11B, etc., of other figures, are provided in their upper surfaces with long narrow line conveyors. A slot 120 in each tine 111 serves to confine and guide spike carrying chains. The chains are generally below the level of the top surface of the tine but the spikes or teeth project high enough to dig into the bottom of a bale above. The spikes are mounted individually on blocks 118 which are secured to links of conveyor chains 113. These are driven by sprockets 115 on a shaft 117 which is driven reversibly from a suitable power source, such as a power take-off on a farm tractor, not shown. The chains run around idler sprockets 119 mounted near the pointed ends of the tines and their upper reaches pass through slots 120 in the tines. The chains bear upstanding teeth 125 and their lower reaches run inside the tines 111. With this arrangement, by driving the chains 113 forward, i.e. toward the pointed ends of tines 111, the load is pushed off the stacker. The teeth 125 of course, engage the bales on top of the tines. By a reverse movement, the stacker can be pulled up to the stack or given an assist in inserting tines 111 between the spaced bottom bales for taking a load out of a stack.

In order to grip the bales which are caught between tines 11, i.e. for lifting them off the ground, and for forming a platform, as already described, rocking gripping plates 61 are mounted in the tines. Each plate 61 is fixed to a longitudinally extended gripper shaft 63 mounted for rocking movement. The grippers 61 are arranged to be moved in and out of the partial housing or enclosure which each tine forms for most of its length. These tines 11, as best shown in FIG. 5, are generally "C"-shaped in cross-section for a large part of their length. The tines are formed of steel or other strong metal and shaped to a channel, giving an outline profile that is generally rectangular. The vertical width of each tine 11 should be at least half that of a bale and may be as great, approximately, as the width (second largest dimension) of a standard bale of hay. The thickness or horizontal width of each tine preferably is considerably less than this, e.g. 3 to 5 inches or so in a typical case. The space between adjacent pairs of tines 11, as already noted, is such that a standard bale thickness (or smallest dimension) fits smoothly but not tightly between tines. The gripper shafts 63 are rocked by a linkage 68 connected to a piston 69 in a hydraulic cylinder 70. By these means the plates 61 can be moved from full line non-holding position to dotted line baleholding position. The plates 61 press into the side of each bale with sufficient depth and force to grip the material tightly between plate 61 and the next adjacent tine member 11. Members 61, on rocker shafts 63, are mounted in bearings 64, see also FIG. 6. Grippers are provided in four out of the five tines since gripping the bales from one side with a rocker plate 61 usually is sufficient. If desired, however, both of the outside tines 11A and 11E, as seen in FIG. 5, may have a single gripping plate which can be swung toward the adjacent inner tine 11 whereas the intermediate tines 11 each have double plates or projecting elements on either side which can thus grip the bales from both sides. Double gripping may be desirable in cases of very heavy bales or for smooth or slippery material; for example, gripping from both sides might be needed if hay were baled wet and therefore the bales were much heavier and more slippery and hence harder to hold than normal baled dry material.

Figure 4:
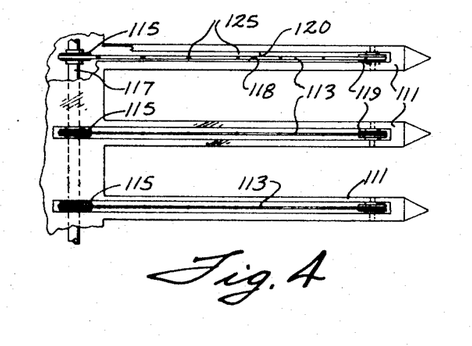
FIG. 4 is a detail view on a larger scale, showing tine elements in plan view, provided with a conveyor or traction chain.

Hydraulic fluid for operating the pistons 69 as well as elevator pistons in cylinders 17, is supplied from a main pump unit 75. The latter is shown as mounted on the front of the tractor 40 in FIGS. 2 and 3. It can be mounted on the loader, if desired, and can be driven by any appropriate prime mover, preferably by power take-off from the tractor motor. This same hydraulic pump preferably supplies fluid through lines 77 to a control unit 78 and thence to the elevator cylinders 17, as well as to cylinders 70. It has already been stated that the traction chains 113, FIG. 4, are driven by a shaft 117 which, in turn, is driven by power take-off from a tractor, truck or other prime mover.

By appropriate control of one or another of levers 80 or 81 on the control unit 78, the tractor operator can control the level of the bale gathering tines 11 through cylinders 17 and their pistons 16, and he can control the bale gripping operations through cylinder 70 and piston 69.

The hydraulic cylinders 17 are firmly secured to the rectangular guide tubes 18 as mentioned above, and one of these assemblies is fixed at the front and rear, respectively, of each side frame element 20 of main frame 19. A piston rod 90 connects to each piston 16 and extends from the top of cylinder 17. Rod 90 is attached to a header 92 which is secured also to a vertically slidable link member 93. The latter fits in smooth sliding relation inside guide tube 18. See FIGS. 1 and 5, especially. The lower ends of members 93 are each secured to a cantilever bracket 95 fastened either to sub-frame 13 or to an outer face of outside tines 11A or 11E. Hydraulic lines 98 and 99 control the flow of hydraulic fluid in cylinders 17 under control of lever 80. By this means the tractor operator can control the level at which the tines are operating or can raise or lower them. The flow of fluid to all four pistons 16 is adjusted to move them all at the same rate and time. This is accomplished by proper distribution and throttling of the hydraulic fluid from pump 75. The solid end of the sub-frame preferably has a vertical fence or barrier 100 so that bales may be stacked against it. Vertical bars or posts 101, 102, 103, 104 are fastened to the transverse rear member 14 of sub-frame 13 and may be reinforced by angle braces 106 at each corner. A grid or some transverse bars or heavy wires 108 between the posts forms a rear wall to support and stabilize the load.

Figure 7:
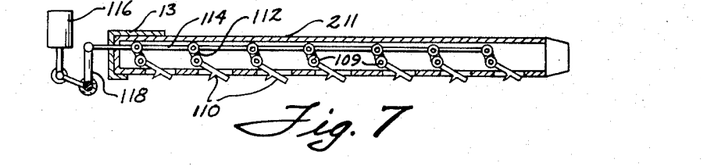
FIG. 7 is a detail view, partly in section, of a modified tine with another type of bale holding mechanism.

A modified arrangement for gripping the bales is shown in FIG. 7. A series of gripper members 110, all pivoted on vertical axes to swing in a horizontal plane are spaced along each tine. Means provided for their simultaneous rotation to gripping position include an arm 112 projecting laterally from each shaft inside the "C"-shaped structure which constitutes the tine 11. Each gripping element 110 is secured to a vertically extending shaft 109 pivoted in bearing elements in the upper and lower wall elements of tine 211. A connecting rod or linkage 114 is pivotally attached to each of these arms 112 and is operated by a suitable mechanism at the front end of the loader. This mechanism is not shown in detail, but involves linkage 115 and a hydraulic cylinder power source 116 similar to elements 69, 70, etc., for moving rod 114 longitudinally. It can include a hydraulic cylinder for each tine in case individual gripping between tines is desired. The same result can be accomplished also by securing the longitudinal links in turn to rocker arms which are connected to a transverse linkage such as 68, FIG. 5, and operated by a hydraulic piston and cylinder essentially the same as piston 69 and cylinder 70 of FIG. 5.

Obviously, the bale gripping mechanisms, of either of the types shown in FIGS. 5 and 7, may be projected from either side or both sides of tines 11. In the latter case, appropriate slots or other openings to permit such projection are provided in both sides of these tines; the "C"-shaped cross-section shown in FIG. 5 may be modified appropriately. Tine members of other shapes such as I-beams may be used instead of the channel members 11, allowing the projecting plates or grippers 61 or 110 to protrude from either side. It is desirable to keep this mechanism as simple as possible. For this reason, the construction shown in FIG. 5 is presently preferred.

When the bale handler is fully loaded, it is pushed (or pulled) up to the stacking or unloading position. The hydraulic cylinders 17 and piston 16 are operated to lower the tines to rest on the floor or the ground. The grippers 61 or 110 are withdrawn by operation of hydraulic piston 69 in cylinder 70 or by cylinder 116. With the stack thus supported on spaced bales resting on the ground, the loader is pulled or backed out of the stack. The traction chains 113, with upwardly projecting pins engaging the bales on the tops of the tines, help to shove the bales off and to withdraw the loader from under them. The upper bales are piled exactly as they were on the lower tier of bales B, which thus serve as spaced pallet elements.

Later, when it is desired to withdraw bales from the stack, the loader unit is brought up to the stack and the tines 11 are inserted between the bottom bales B to the depth of one bale, two bales or more, as desired. Chains 113, when used, help to draw the tines into the stack. For taking only one or two rows of bales off the front of the stack, the tines are inserted only to the length of one or two bales. The hydraulic lifting mechanism 16, 18, etc., is then operated through cylinders 17 to raise the desired bales from the stack. In case mixed feeding is desirable, which is often the case, a single row or two rows of bales may be taken from a first stack of alfalfa, for example, another row or two may be taken from a stack of grass, oats, or some other feed, and then the combination or mixture of feeds may be transported as a unit to the feed lot. The bale grippers 61, or 110, of course, are turned out into gripping position so as to hold the bottom tier of bales. The bales above ride securely on top of these. This method requires little or no manual handling of bales for either the actual stacking or the unstacking. The only bale handling involved is that of placing and arranging the bales for proper interlocking on the loader in the first place. Some of the bales must lie crosswise of others to interlock the stack and make it more stable; this can limit the manner in which the bales may be withdrawn from the stack. A typical stacking arrangement is shown diagrammatically in FIG. 9 where the bottom bales B are set on edge in spaced rows and bales C above them are turned various ways to interlock and stabilize the stack.

Figure 8:
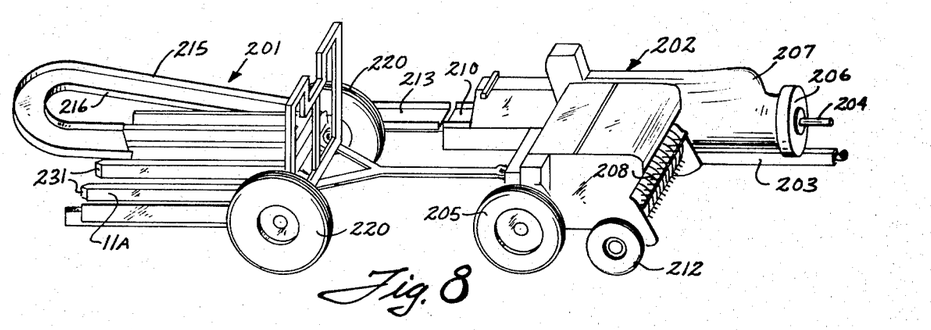

FIG. 8 shows an arrangement wherein the stacker or bale handler 201 is to be drawn behind a conventional field type baler 202. The baler is pulled by a tractor or truck, or other prime mover, not shown, attached to tongue 203. A power take-off, also not shown but of conventional type, drives the baler operating shaft 204 and flywheel 206. The bale pressing mechanism is in housing 207.

The baler has a rotary rake or pick-up sweeper mechanism 208 which gathers hay from the field and feeds it into the baler. Bales are ejected rearwardly onto a platform 210. The baler is supported on main wheels 211 and pilot wheels 212.

An extension platform 213 is connected to the baler platform. It extends rearwardly and loops around above the loader 201. This extension platform has side rails 215, 216 to guide the bales so that they are delivered to the loader. The baler plunger, of usual type, is not shown but it ejects finished bales onto the platform and these push the previous bales one by one until the looped platform is filled. Thereafter, bales drop one by one onto the loader where the operator can arrange them as he desires. He stands on the composite platform of first layer bales and tines, as he works, these bales being gripped adequately between the tines to support his weight.

Instead of the looped platform, some balers are equipped, or may be equipped, with a throwing arm. This device takes the bales one by one as they come out of the baler and delivers them laterally to the loader. A small auxiliary platform, not shown, may be provided to receive them, as will be obvious.

The loader of FIG. 8 is supported at or near its front end on wheels 220. The elevating mechanism for raising and lowering the tines 231 is omitted for simplicity. It will be understood that the latter is essentially the same as in FIGS. 1 to 5. Hydraulic power is supplied through conventional lines from the prime mover. However, a pneumatic or hydraulic pump mechanism or other lift device can be operated from wheels 220, by appropriate gearing if desired, as is often done on farm machinery. Such mechanism is obvious to those skilled in the art. In general, reference herein to hydraulic power or hydraulic operation will be understood to include pneumatic operation.

Figure 10:
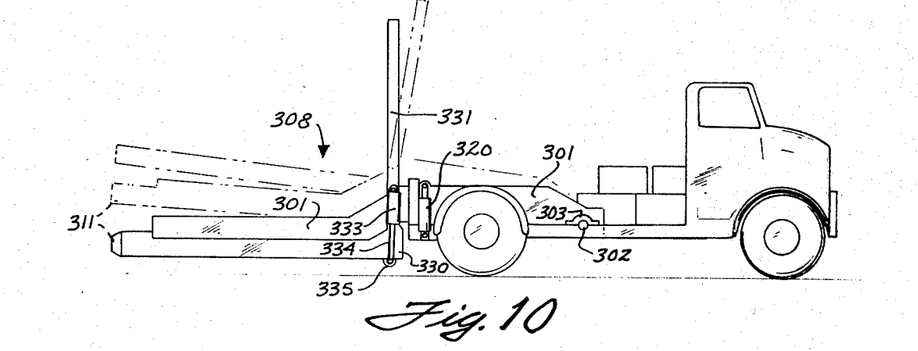
FIG. 10 shows a modification wherein the whole unit is carried by a truck.

FIG. 10 shows a modification where the whole loader 308 is operated from and supported by a truck. The loader in this modification comprises main side rails 301. These are pivotally attached at their forward ends by pins 302 to brackets 303 secured to the truck body main side rails. Hydraulic piston and cylinder units 320 secured to the truck at its rear corners are arranged to lift the rails 301 to cause them to pivot around pins 302. These, therefore, can lift the side rails 301, and the whole loader mechanism which is supported by them, high off the ground, as shown in dotted lines.

The tines 311 and their sub-frame 330, including the front bolster 331, can be lifted independently of the main side rails 301, by hydraulic cylinders 333. The latter are secured to the respective side rails and their piston rods 334 are attached to the bottom of the side frame at 335. Hydraulic operating fluid is supplied from the truck through lines not shown.

The arrangement of complete mounting on a truck has several advantages. It is more maneuverable than the separately mounted loader. Also, the truck can be used to carry additional bales. For loading in the field, the truck can be driven backwards readily, without the steering problems of a three-axle arrangement.

Figure 11:
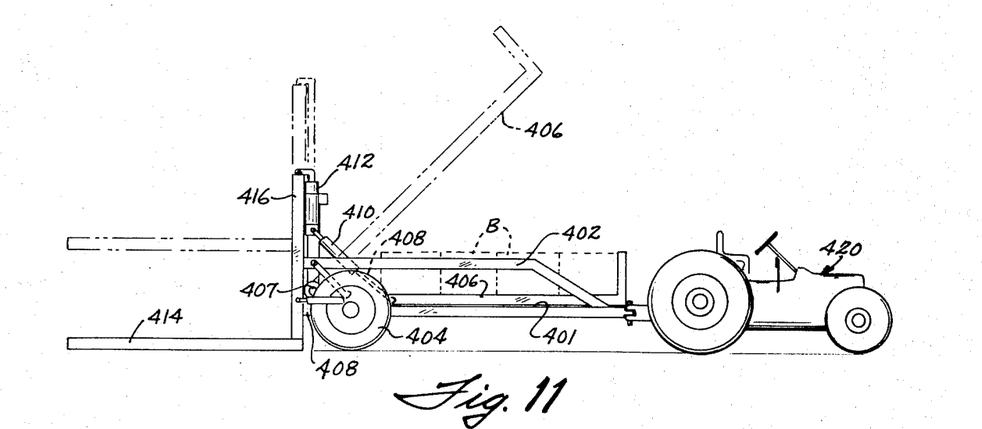
FIG. 11 shows a modification, with a balancing load carrying extension.

FIG. 11 shows another arrangement where a loader has a forward platform 401. This platform is supported by side rail extensions 402 of the main frame 403 of the loader. A pair of wheels 404 supports the whole unit more or less at its midpoint. The arrangement is such that bales may be loaded on the front platform, in addition to the loader per se. A tilting sub-platform 406 pivoted at 407 to frame element 408 is provided for lifting bales BB off the front platform and onto the loader proper. Platform 406 is operated by piston rods 409 extending from hydraulic cylinders 410 mounted on the side rails 402 and the main frame 403. Other hydraulic cylinders 412 are provided to lift the tines 414 and their sub-frame. The latter cylinders are secured to vertical posts 416 attached to the main frame 403 of the loader.

Instead of a tilting platform, a sliding pusher, operated in the same general manner may be used to push bales from the forward platform onto the loader proper. The hydraulic mechanism is operated from the tractor 420 or other prime mover through conventional power take-off and hydraulic lines, not shown. If desired, the wheels 404 can be used to power the hydraulic (or pneumatic) mechanism. Power for brief operation can be stored by compressing air (or other gas) in a suitable reservoir, not shown, as will also be obvious.

Figure 9:
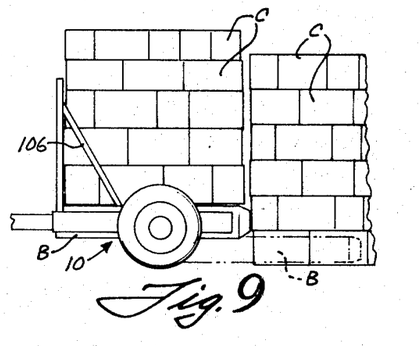
FIG. 9 is a diagrammatic view of a load handling operation for stacking or unstacking.

With any of the arrangements shown, the bales are stacked on the loader by appropriate manual placement and cross-tying. A load is built up to appropriate height. The operator drives the load up against the stack, as shown in FIG. 9, and lowers the tines to the ground. He then releases the gripping plates which lock bales between the tines and backs the stacker out from under its load. Where appropriate, he sets the chains 113, FIGS. 1, 4, 6, to assist. The operation is reversed to remove bales from the stack, as explained above.

The dimensions of this apparatus are designed for handling bales of appropriate or normal size. Hay bales commonly are about 14 to 16 inches thick with major dimensions approximately 18 × 36 inches, which facilitates interlocking in the stack. A spacing between the tines of about 16 inches or so is appropriate for picking up and gripping bales which are lying on edge in the field. Obviously, bales can be picked up while lying flat on their wider faces, if desired, in which case the spaces between tines must be wider. It will be understood that the bale gripping means, the conveyor chains 113, and other movable parts may be operated by pneumatic or hydraulic mechanism, even when such is not shown in the drawings.

The invention has several advantages over equipment of the prior art:

A large number of bales can be carried at a single load without the necessity of using pallets. It largely eliminates manual labor in unloading. The baled material can be put into or taken out of the stack in large blocks or groups of bales by the same mechanism and with no manual labor or a minimum of such labor. The equipment is especially designed for and is eminently satisfactory for handling baled hay or straw. Obviously, it can be used for other baled and boxed material. The stacker of this invention is comparatively simple and not unreasonable in cost.

Instead of having a fixed axle mount of FIG. 1 or the caster wheel mounting of FIGS. 2 and 3, the apparatus can be mounted without wheels directly on a tractor or truck, as in FIG. 10. In this form it can be operated somewhat like a front-end loader. In some cases, special arrangements may need to be made so that the operator can see around or over the load. Hay is commonly stacked in piles considerably higher than tractor operator can see over. Mirrors or periscopes can be used where an off-set arrangement such as is shown in FIG. 3 is not used or is inadequate. Other labor saving devices can be used as auxiliaries. Conventional elevators, throwing arms, etc., can be used to get the bales onto the stacker, from the ground or direct from a bailing machine.

A typical operation for placing bales in or taking bales out of a stack is shown diagrammatically in FIG. 9. A block of bales three bale lengths deep including bottom layer bales B is shown on loader 10 as being off the ground for loading into or taking from the stack. A smaller group of these bales can be removed from the stack as a unit, when desired, although such removal might require a different manner of arranging and interlocking the upper layers, as will be apparent. The width of the device is at least three tines (for two rows of bales) but preferably four or more tines are used.

For safety of operator personnel, guard rails or hand holds which are not shown in the drawings may be provided along the sides of the machine to give them security during movement. The load may be set on the ground, periodically, to permit the proper placement of bales at higher levels.

Various modifications may be made in the apparatus and it may be associated with various other machines, including not only those mentioned above but others which may be obvious or which may suggest themselves to those skilled in the art. It is intended by the claims which follow to cover such alternatives as broadly as the prior art properly permits.

What is claimed is:

1. In apparatus for receiving and carrying a plurality of bales of compressible or penetrable material such as hay or straw, the improvement which comprises, in combination, a main frame having a transverse main frame member and a pair of elongated side members rigidly fixed to said transverse member and extending along opposite sides of a rectangular bale carrying bed area of which the main transverse member forms one end, said main transverse member being adapted for attachment to and support by a prime mover such as a tractor or truck, a subframe movably mounted within the bed area and between said side members and comprising a rigid transverse beam member, fluid operated piston means secured to said main frame and attached to said subframe for raising and lowering the subframe with respect to said side members, said subframe also comprising a plurality of large spaced parallel tines fixed to said transverse beam member and extending from the general location of said transverse frame member and between said side members to define the general bottom level of said bed area, said tines being spaced apart far enough to receive bales between them, movable gripper means in said tines for compressing or penetrating said bales to lock them to said tines, thereby to form a generally continuous bale holding bed area made up of said tines and of bales held between said tines, and power operated means connected to said prime mover for raising the subframe and also for operating the bale gripper means.

2. Apparatus according to claim 1 which comprises ground wheels secured to said side members for supporting the weight of said main frame independently of said prime mover.

3. Apparatus according to claim 2 in which said ground wheels are swivel mounted.

4. Apparatus according to claim 1 in which the transverse main frame member is directly supported by a prime mover to bear at least a substantial part of the whole load.

5. Apparatus according to claim 1 in which the side members are supported on swivel wheels and the transverse main frame member is supported and guided by a prime mover.

6. Apparatus according to claim 1 in which plural fluid lift means are provided an each side member for raising and lowering the subframe with respect to the main frame.

7. Apparatus according to claim 1 in which a bale shifting means is incorporated in at least one of said tines for moving bales lengthwise of said tines.

8. Apparatus according to claim 1 which includes means for transferring bales from a traveling bale carrier to said bale holding bed area.

9. Apparatus according to claim 8 in which the bale transferring means comprises a chute connected directly to a baler.

10. Apparatus according to claim 8 in which the bale delivering means is a tiltable bale carrier.

* * * * *